United States Patent [19]

Bloor et al.

[11] Patent Number: 4,832,119

[45] Date of Patent: May 23, 1989

[54] MULTI-TUBE HEAT EXCHANGER AND CONNECTORS THEREFOR

[76] Inventors: Trevor J. Bloor, 4 Inveray Avenue, Benowa 4217 Queensland; Lawrence J. Walton, Jabiluka Drive, Nerang 4211 Queensland, both of Australia

[21] Appl. No.: 56,541

[22] Filed: Jun. 1, 1987

[30] Foreign Application Priority Data

Jun. 5, 1986 [AU] Australia .............................. PH6259

[51] Int. Cl.⁴ ............................................. F28F 1/32
[52] U.S. Cl. .................................. 165/171; 165/172; 165/173
[58] Field of Search ....................... 165/171, 172, 173; 285/162, 192, 196, 921; 248/56

[56] References Cited

U.S. PATENT DOCUMENTS

| 2,029,437 | 2/1936 | Murray | 165/171 |
| 3,178,806 | 4/1965 | Keith | 165/171 X |
| 3,434,746 | 3/1969 | Watts | 285/162 |
| 3,648,768 | 3/1972 | Sch,e,uml/o/ ell | 165/171 |
| 4,270,596 | 6/1981 | Zinn et al. | 165/46 X |
| 4,285,397 | 8/1981 | Östbo | 165/171 X |
| 4,354,546 | 10/1982 | Zinn | 165/46 X |
| 4,406,130 | 9/1983 | Hemmerich | 165/171 X |
| 4,468,535 | 8/1984 | Law | 285/162 X |
| 4,597,597 | 7/1986 | Bloor et al. | 285/196 |
| 4,627,647 | 12/1986 | Hauff | 285/162 X |

FOREIGN PATENT DOCUMENTS

| 2351499 | 4/1975 | Fed. Rep. of Germany | 285/162 |
| 2257848 | 8/1975 | France | 285/162 |

OTHER PUBLICATIONS

Wellington Engineering Works Ltd. Advertisement, 11/64.

Primary Examiner—Ira S. Lazarus
Assistant Examiner—Richard R. Cole
Attorney, Agent, or Firm—Bauer & Schaffer

[57] ABSTRACT

A heat exchanger particularly for solar water heating applications including a plurality of fluid conducting ducts separated by a plurality of webs which are spaced apart longitudinally to leave substantial regions of the ducts free of webs. The ducts are connected to supply and return manifolds via connectors, the connectors having recesses into which the ends of the ducts are inserted and retained when the connectors are inserted in apertures in the manifolds.

10 Claims, 3 Drawing Sheets

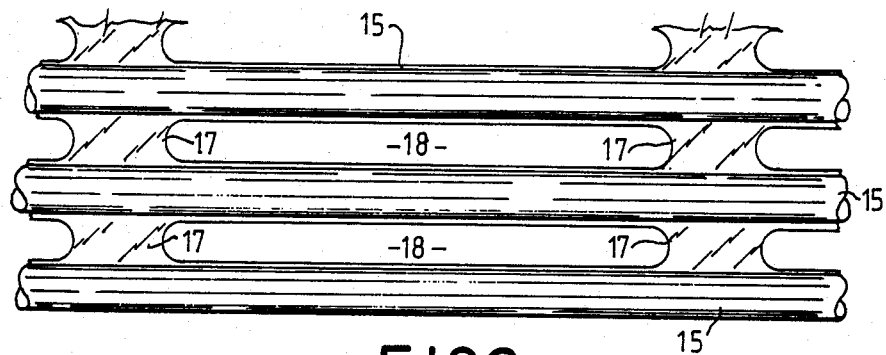
FIG.3
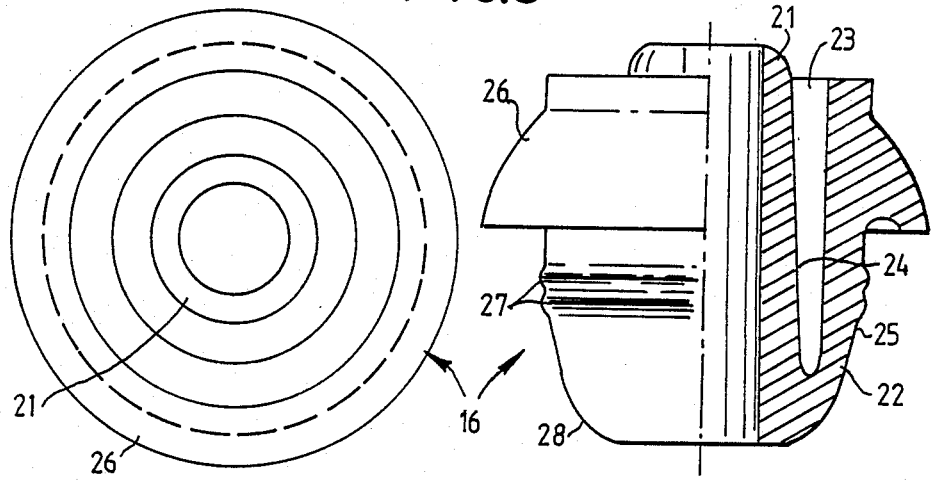
FIG.4
FIG.5
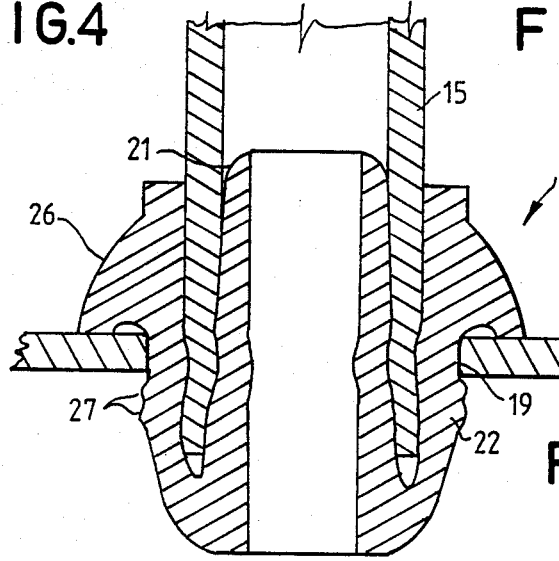
FIG.6

MULTI-TUBE HEAT EXCHANGER AND CONNECTORS THEREFOR

FIELD OF THE INVENTION

This invention relates to improvements to heat exchangers and in one aspect to heat exchangers adapted for solar heating of water particularly water from swimming pools. The present invention also relates to connection means for connecting ducts particularly heat exchanger ducts to fluid flow manifolds or other members.

DESCRIPTION OF RELATED ART

Solar heat exchangers of the type having an absorber formed of a plurality of ducting members which are arranged to be exposed to the sun and which convey water to be heated are well know. For the heating of swimming pools such absorbers are generally formed of a synthetic rubber or plastics material and in many instances, the absorber is extruded with the ducting members separated by continuous connecting webs. Examples of such absorbers are shown in U.S. Pat. Nos. 4,269,172 and 4,270,596. So that the absorber may be connected to water conveying manifolds, it is necessary that the webs be removed from between the ducting members adjacent their connection point to the manifolds. This may either be achieved by cutting the webs away from the ducting members or constructing the heat exchanger so that the webs may be stripped from the ducting members along tear lines formed between the webs and ducting members.

The above procedures are obviously time consuming and therefor add to the overall cost of the installation. Furthermore, heat exchangers which have continuous webs separating the ducting members are relatively expensive in material costs whilst the webs tend to shield the lower portion of the ducting members from the sun as well as the underlying roof or other supporting surface so that maximum heat transfer to the ducting members is not achieved.

Many different arrangements have been proposed for connecting ducting members to manifolds or other members through an aperture in a wall thereof such as the arrangement disclosed in our U.S. Pat. No. 4,597,597. In this arrangement the connection assembly comprises three separate parts, a plug which is inserted into the manifold aperture, a spigot inserted into the plug and a sleeve which secures the ducting member to the spigot. Whilst this arrangement functions, as an efficient connector assembly, use of three separate connection parts adds to overall cost as well as increasing assembly time.

SUMMARY OF INVENTION

The present invention aims to overcome or alleviate at least some of the above disadvantages by providing an improved heat exchanger particularly suited to solar heating applications which is relatively inexpensive both in its component cost and installation cost and which will function in a reliable and efficient heat exchanging manner. The present invention also provides an improved connection assembly and connector therefor particularly suited for the connection of the ducts or tubes of the above heat exchanger absorber to a manifold. The connector and connection assembly however may be used in a range of applications for the connection of tubes or ducts to manifolds, containers or other objects.

With the above and other objects in view, the present invention resides broadly in one aspect in a heat exchanger including an absorber having at least one pair of substantially parallel ducting members, and a plurality of web portions formed integrally with said ducting members and spacing said ducting members apart, said web portions being arranged at spaced positions along said ducting members so as to define a plurality of areas between said ducting members substantially free of said web portions.

Suitably, the heat exchanger includes a pair of manifolds for conveying water to and from the absorber and the ducting members of the absorber are connected to the respective manifolds in the regions substantially free of the web portions. Preferably, the manifolds are provided with a plurality of longitudinaly spaced apertures in their walls, alternate ones of which are suitably located in two spaced apart longitudinally extending rows.

The present invention also provides in a further aspect, a connector for connecting the above or other ducting members to a manifold or other member through an aperture in a wall thereof, said connector including an inner hollow spigot portion and an outer skirt portion defining therebetween an annular recess for receipt of an end of said ducting member, said connector being locatable within said aperture so that said skirt portion engages with the wall thereof and said ducting member end is sealingly sandwiched within said recess between said skirt portion and said spigot portion.

Preferably, the spigot portion and skirt are interconnected at the leading end of the connector to define a blind annular recess and suitably, the recess tapers towards the leading end of the connector. Preferably, also, the skirt portion is provided with an annular enlarged head portion at a position spaced from the leading end of the connector. Suitably, the connector is formed of flexible plastics or other sythetic material preferably resilient material.

BRIEF DESCRIPTION OF DRAWINGS

In order that the invention may be more readily understood and put into practical effect, reference will now be made to the accompanying drawings which illustrate a preferred embodiment of the invention and wherein:

FIG. 3 is a plan view showing portion of the absorber of the heat exchanger;

FIGS. 4 and 5 are respective plan and part sectional elevational views of a connector for connection of a ducting member of the heat exchanger to a manifold; and FIG. 6 illustrates in sectional view the manner of connection of a ducting member to a manifold via the connector shown in FIGS. 4 and 5.

DESCRIPTION OF PREFERRED EMBODIMENT

Figure 1:
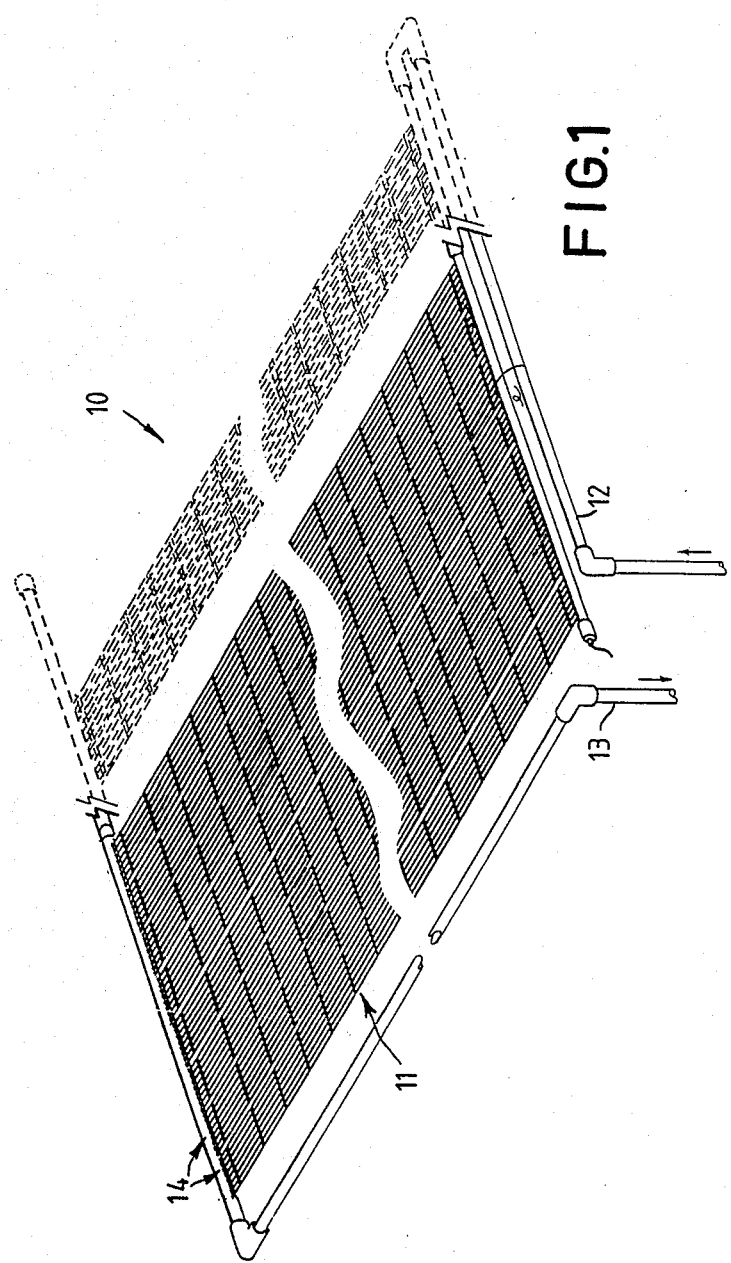
FIG. 1 is a perspective view of a solar heating installation incorporating a heat exchanger and connector according to the present invention.
Figure 2:
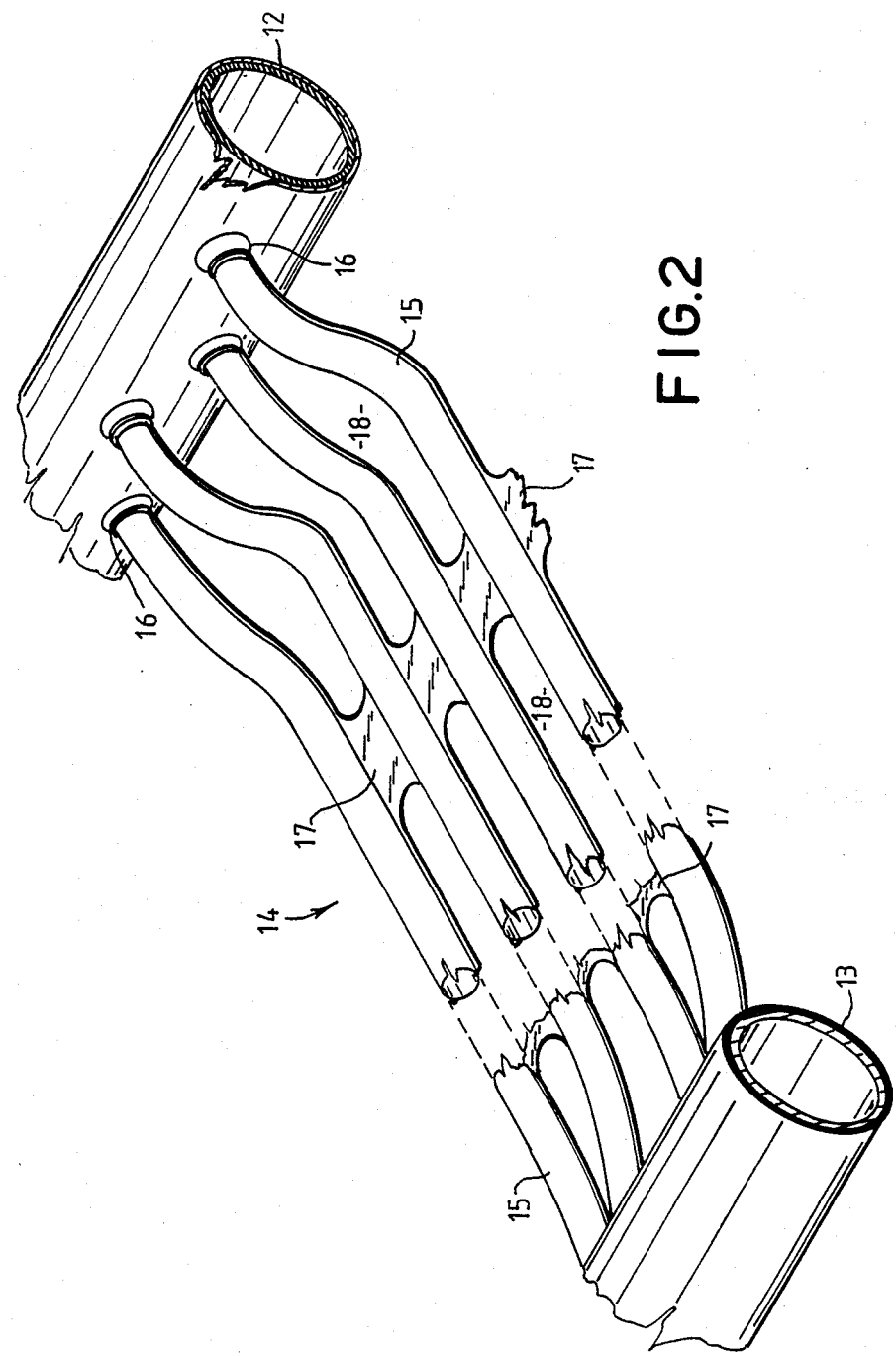
FIG. 2 is a perspective partly cut-away view of portion of the heat., exchanger of FIG. 1.

Referring to the drawings and firstly to FIGS. 1 to 3, there is illustrated a solar heating system 10 incorporating a heat exchanger 11 according to the present invention which is suitably mounted directly on the roof of a building for example the roof of a dwelling. The system 10 in this instance is adapted for heating of water in a swimming pool and for this purpose, the heat exchanger 11 includes a supply manifold 12 which receives water pumped from the pool filter assembly and a return manifold 13 which directs heated water back into the pool.

The heat exchanger 11 includes an absorber formed of a plurality of groups 14 of ducting members or tubes 15 connecting at opposite ends to the manifolds 12 and 13 via respective connectors 16. The ducting members 15 are spaced apart to lie in a substantially parallel relationship by a plurality of integrally formed webs 17 which preferably extend diametrically of the tubes 14. Preferably the groups of tubes and integral webs are extruded from a P.V.C. material such as that known under the trade mark SUNPRENE.

As shown the webs 17 are arranged at spaced apart positions along the tubes 15 so as to form between the tubes 15 a plurality of areas substantially free of webs 17. Where it is required to connect the groups of tubes 12 to the manifold 12 or 13, the tubes 15 may be simply transversely severed in an area where the tubes 15 are free of the webs 17 to enable engagement of the tubes 15 with the connectors 16. This arrangement of webs 17 also facilitates passage of the groups of tubes 15 around or past obstructions such as vent pipes in a roof surface upon which the heat heat exchanger 11 is laid. Furthermore, as the webs 17 leave a major area of the tubes 15 exposed, maximum exposure to direct radiation from the sun is achieved. Furthermore, this arrangement permits the surface of the underlying roof to be largely exposed to the sun so that the tubes 15 also receive high reflected radiation therefrom. The above described arrangement also ensures that the roof area will dry rapidly in the event of rain to thereby reduce the risk of corrosion consquent upon water being trapped beneath the webs 17.

Suitably the tubes 15 in each group 14 are 7.2 mm. external diameter and spaced apart on centres typically of 14.6 mm. Preferably also the webs 17 are in the range of 15 to 30 mm. in length and most preferably 20 mm. whilst the preferred spacing between the webs is 120 mm. to 180 mm., typically 150 mm. Furthermore, the groups of tubes 15 are preferably formed as an extrusion with continuous webs between the tubes 15, portions of which are punched out or otherwise removed after extrusion to form the areas 18. Alternatively, the groups of tubes 15 may be formed simply as an extrusion with the areas 18 free of webs being formed during the extrusion process.

As stated above the groups 14 of tubes 15 and webs 17 are preferably constructed of a P.V.C. material. Alternatively, the groups of tubes may be an elastomer such as E.P.D.M. or other synthetic of natural flexible material. Preferably, the groups of tubes comprise an eight (8) tube extrusion although any number of tubes 15 may be incorporated as desired.

The heat exchanger 11 may of course be arranged in any known configuration such as between spaced supply and return manifolds as shown in FIGS. 1 and 2 or arranged so that a pair of tubes 15 are interconnected at one end and connected at their opposite ends to respective supply and return manifolds. The webs 17 may also be arranged substantially tangentially to the tubes 15 however in either case, the webs 17 are preferably relatively thick and therefor substantially rigid so that the tubes 15 can be maintained in a spaced apart attitude.

Referring now to FIGS. 4 to 6, there is illustrated details of the connector 16 for connecting ducting members such as the tubes 15 to a manifold 12 or 13 through an aperture 19 in a wall 20 thereof. The connector 16 includes a generally tubular internal hollow spigot portion 21 and an outer concentric skirt portion 22 secured to by being formed integrally with the leading end of the spigot portion 21 and defining with the spigot portion 21 an annular recess 23 for receipt of an end of the tube 15. Preferably the outer wall 24 of the spigot portion 21 diverges outwardly so that the recess 23 tapers in width towards the leading end of the connector 16. Formed integrally on the outer wall 25 of the skirt portion 22 is an annular head portion 26 and a pair of annular enlargements or ribs 27 are formed on the wall 25 at a position spaced from the head portion 26. Suitably also the leading end of the connector 12 is externally tapered at 28 to facilitate its insertion into the aperture.

In use and as shown in FIG. 6, the end of a tube 15 is initially forced into the tapering recess 23 so that it is held between the spigot portion 21 and skirt portion 22. If necessary to ensure that the tube end remains attached to the connector 16, a small amount of adhesive may be applied to the end of the tube 15 or recess 23. The connector 16 may be then forced in to the aperture 19 so that the ribs 27 are radially compressed as they pass through the aperture 19 to be located on the opposite side of the manifold wall 20 to the head portion 26. The connector skirt portion 22 and aperture 19 are of such a size that the skirt portion 22 is radially compressed in the region between the head portion 26 and ribs 27 so that the end of the tube 15 is sealingly squeezed and sandwiched between the inwardly compressed skirt portion 22 and tubular spigot portion 21. At the same time, the ribs 27 serve to inhibit withdrawal of the connector 16 from the aperture 19 whilst the preferred configuration of head portion 26 as illustrated , that is of generally domed skirt form, improves sealing on the opposite side of the aperture 19. The above arrangement also constrains the tube 15 against withdrawal both from the connector 16 and manifold.

In the arrangement shown in FIG. 2, a plurality of apertures 19 are provided longitudinally of the respective manifolds 12 and 13 and preferably, the apertures 19 are provided alternately in rows to reduce the risk of cracking of the manifolds 12 and 13 between adjacent apertures 19.

Of course, many variations may be made to the constructional details of the connector 16. For example, the recess 23 may be made of non-tapering form or alternatively, the inner wall of the skirt portion 22 may converge towards the end of the connector 16 to define the taper in the recess 23. The ribs 27 may be increased in radial dimension if required whilst only one or any number of ribs may be employed. The head portion 26 may also be altered in configuration.

Preferably, the connector 16 is formed of a P.V.C. material such as SUNPRENE however it may also be an elastomer or other sythetic or natural flexible or resilient material.

It will be apparent from FIGS. 2 and 3 that the connectors 16 permit suitable sealing of the tubes 15 to the manifolds even if a small web portion remains attached to the tubes 15 as where the webs may be severed between the tubes. Whilst the connectors 16 as described above are used in a heat exchanger/manifold connection, it will be apparent that such a connector may be employed in any application where a duct is to be connected to a member or container through an aperture in a wall thereof.

In the heat exchanger of FIGS. 1 and 2, it is preferred that the groups of tubes 15 are attached to the roof surface for example by means of an adhesive and furthermore, a clip arrangement is preferably provided to secure the manifolds to the roof. In a preferred construction as illustrated in FIG. 2, the manifolds 12 and 13 are formed as a coextrusion with the inner portion comprising a normal P.V.C. pipe with an outer protective skin of plastics material such as that known under the trade mark LURAN S.

Whilst the above has been given by way of illustrative embodiment of the invention, it will be realized that many modifications and variations may be made thereto as would be apparent to persons skilled in the art without departing from the broad scope and ambit of the invention as defined in the appended claims.

What is claimed:

1. A heat exchanger including an absorber formed of flexible plastics or other elastomeric material, said absorber including a plurality of substantially parallel tubular ducting members, and a plurality of web portions extending diametrically between adjacent ducting members and spacing said ducting members apart, said web portions being arranged at regular spaced apart positions longitudinally of said absorber so as to define a plurality of regions between adjacent ducting members free of said web portions, and wherein said web portions between adjacent ducting members are substantially aligned transversely of said absorber whereby transverse severing of said absorber in a said region exposes ends of a plurality of said ducting members substantially free of said webs portions.

2. A heat exchanger according to claim 1 wherein said absorber is transversely severed at regions spaced apart longitudinally of said absorber to express opposite ends of said ducting members substantially free of said webs portions 3. A heat exchanger according to claim 2 and including a pair of manifolds for conveying water to and from said absorber and wherein opposite said ducting member ends are connected to the respective said manifolds.

4. A heat exchanger according to claim 3 wherein said manifolds are provided with a plurality of longitudinally spaced apertures in the walls thereof and there being provided a plurality of connectors engaged with said opposite ends of said ducting members and sealingly received by respective said apertures.

5. A heat exchanger according to claim 4 wherein each said connector includes an inner hollow spigot portion and an outer skirt portion interconnected at the leading end of said connector, said skirt portion extending rearwardly from said leading end and defining with said spigot portion an annular recess and wherein said ducting member end is disposed within said recess and said spigot portion sealingly extends into the interior of said ducting member end.

6. A heat exchanger according to claim 5 wherein said skirt portion sealingly projects into said manifold aperture and wherein said ducting member end is compressed between said outer skirt portion and said inner spigot portion whereby to be sealingly retained in fluid communication with said manifold.

7. A heat exchanger according to claim 6 wherein said skirt portion includes an enlarged annular head portion at a position spaced from said leading end of said connector and disposed on one side of said manifold wall and said skirt portion including at least one annular enlargement at a position spaced from said head portion, said annular enlargement being disposed on the side of said manifold wall opposite said head portion.

8. A heat exchanger according to claim 5 wherein the outer wall of said spigot portion diverges towards said leading end of said connector so that said recess tapers in width towards said leading end.

9. A heat exchanger according to claim 1 wherein the dimension of each said web portion in a direction longitudinally of said absorber is substantially smaller than the longitudinal spacing between said web portions.

10. A heat exchanger including an absorber formed of flexible plastics or other elastomeric material, said absorber including a plurality of substantially parallel tubular ducting members and a plurality of web portions formed integrally with said ducting members and lying in a plane diametrical to said ducting members, said web portions spacing said ducting members apart and being disposed at spaced apart positions longitudinally of said absorber so as to define a plurality of regions between said ducting members free of said web portions, the dimension of said web portions in a direction longitudinally of said absorber being substantially less than the longitudinal spacing between said web portions, and said web portions being substantially aligned transversely of said absorber whereby transverse severing of said absorber in a said region exposes ends of a plurality of said ducting members substantially free of said web portions.

* * * * *